United States Patent
Wu

(10) Patent No.: US 9,035,530 B2
(45) Date of Patent: May 19, 2015

(54) ENERGY CONVERTING DEVICE HAVING AN ECCENTRIC ROTOR

(71) Applicant: National Yunlin University of Science and Technology, Yunlin County (TW)

(72) Inventor: Shang-Teh Wu, Yunlin County (TW)

(73) Assignee: National Yunlin University of Science and Technology, Yunlin County (TW)

( * ) Notice: Subject to any disclaimer, the term of this patent is extended or adjusted under 35 U.S.C. 154(b) by 310 days.

(21) Appl. No.: 13/796,275

(22) Filed: Mar. 12, 2013

(65) Prior Publication Data

US 2014/0265678 A1    Sep. 18, 2014

(51) Int. Cl.
*H02K 21/12* (2006.01)
*H02K 21/24* (2006.01)
*H02K 7/075* (2006.01)

(52) U.S. Cl.
CPC ............... *H02K 21/24* (2013.01); *H02K 7/075* (2013.01)

(58) Field of Classification Search
None
See application file for complete search history.

(56) References Cited

U.S. PATENT DOCUMENTS

| | | | | |
|---|---|---|---|---|
| 3,883,633 A | * | 5/1975 | Kohler | 310/152 |
| 5,633,551 A | * | 5/1997 | Weh | 310/266 |
| 6,177,746 B1 | * | 1/2001 | Tupper et al. | 310/166 |
| 6,750,588 B1 | * | 6/2004 | Gabrys | 310/268 |
| 6,791,222 B1 | * | 9/2004 | Maslov et al. | 310/156.38 |
| 7,485,992 B2 | * | 2/2009 | Ekchian et al. | 310/37 |
| 2007/0210659 A1 | * | 9/2007 | Long | 310/80 |

* cited by examiner

*Primary Examiner* — Tran Nguyen
(74) *Attorney, Agent, or Firm* — Rosenberg, Klein & Lee

(57) ABSTRACT

An energy converting device having an eccentric rotor includes a fixed portion and an eccentric rotor. This fixed portion has a central axis, an outer frame, and several fixed coil portions. The eccentric rotor has a bearing, a rotatory shaft, an eccentric arm, an eccentric shaft portion, a supporting plate, an inner annular magnetic portion, and an outer annular magnetic portion. The inner magnetic portion and the outer magnetic portion are concentric and aligned with the eccentric shaft portion. The eccentric shaft portion is offset from the rotary shaft. When the rotary shaft of the eccentric rotor rotates, these fixed coil portions cut through the inner magnetic portion and the outer magnetic portion repeatedly, so magnetic flux passing through the coils alternates accordingly to generate electromotive force. Conversely, it can be used as an electric motor. In addition, it can be integrated with a cycloidal speed reducer to form a motor with speed reduction and torque augmentation capability. The integrated cycloidal motor is compact, does not need a shaft coupler to transmit power from a motor to the reducer, and therefore may operate more smoothly.

5 Claims, 13 Drawing Sheets

ENERGY CONVERTING DEVICE HAVING AN ECCENTRIC ROTOR

BACKGROUND OF THE INVENTION

1. Field of the Invention

The present invention relates to an energy converting device having an eccentric rotor. Particularly, it relates to an energy converting device having an eccentric rotor for converting electric energy into mechanical energy. Its advantages and functions are listed as follows. The rotor structure is simple and its magnetic field is evenly distributed. The magnetic flux variation is close to a sine wave. The generated torque is smoother. It can improve the motor's acceleration and deceleration performance. In addition, it can be seamlessly combined with a cycloidal speed reducer so as to form a cycloidal motor.

2. Description of the Prior Art

The traditional motor can be classified into the radial-flux motor 90 and the axial-flux motor 80 by the flux direction. Most motors belong to the radial-flux motor 90 as illustrated in FIG. 1. Its simplified operation principle can be seen in FIG. 2.

FIG. 3A is a cross-sectional view of a traditional axial flux motor. FIG. 3B is a cross-sectional view of an inner structure of the traditional axial flux motor. Comparing with the radial-flux motor, the axial-flux motor has higher torque density. In addition, because the torque of an axial-flux motor is not related to the rotor thickness (T), the motor's axis-to-diameter ratio (length S over diameter D) is lower. It is suitable for applications where axial space is constrained. The axial-flux motor 80 has been developed to be light-weighted, compact, and having high-torque output. In traditional axial-flux motor the magnets 811 with alternating N-S-N-S arrangement are attached to one face of the rotor 81. When the rotor 81 rotates, the magnetic flux through the coil 821 varies periodically, so that counter-electromotive force is generated.

However, the traditional axial-flux motor still has the following drawbacks and problems.

[1] The magnetic field produced by the magnets on the rotor may not be evenly distributed, because it involves several pieces of magnetic segments or is produced by a magnet magnetized into several alternating N-S-N-S zones.

[2] Analysis of the air-gap flux distribution is complicated. It is inappropriate to use 2-deimentional magnetic analysis tool to analyze its flux distribution. Three-dimensional analysis is required, making its design more costly

[3] When the rotor rotates at a constant speed, the magnetic flux does not vary in a sinusoidal manner.

Besides, referring to FIG. 4, the traditional cycloidal speed reducer 70 includes an eccentric connecting shaft 71 (which is an input shaft for the reducer), an eccentric cycloidal disk 72, a ring gear wheel 73 (or called ring pins), a transmitting pin set 74, and an output disk 75. The transmitting pin set 74 and the output disk 75 are formed as one integral structure. The operation principle is illustrated by FIG. 4. There are four processes shown in FIG. 4 for displacement of a tooth distance. When the eccentric connecting shaft 71 rotates, it drives the eccentric cycloidal disk 72 rotating along the inner edge of the ring gear wheel 73. There are 8 teeth (or protrusions) in the eccentric cycloidal disk 72. There are 9 teeth (or protrusions) in the ring gear wheel 73. Thus, there is one tooth difference. After the eccentric connecting shaft 71 rotated 360 degrees, the eccentric cycloidal disk 72 will rotate to move one-tooth away in the opposite direction. Two reference points A and B are marked in FIG. 4 to explain their different rotational directions and their relative motion. However, the connecting shaft 71 must be driven by an external motor in order to transmit power. The combined volume of the motor (snot shown) and the cycloidal speed reducer may be too large for many applications.

SUMMARY OF THE INVENTION

The object of the present invention is to provide an energy converting device having an eccentric rotor. Particularly, it relates to an energy converting device having an eccentric rotor for converting electric energy into mechanical energy. Its advantages and functions are listed as follows. The rotor structure is simple and its magnetic field is evenly distributed. The magnetic flux variation is close to a sine wave. The generated torque is smoother. It can improve the motor's acceleration and deceleration performance. In addition, it can be seamlessly combined with the cycloidal speed reducer so as to form a cycloidal motor.

In order to achieve the above-mentioned objectives, this invention provides an energy converting device having an eccentric rotor comprising:

a fixed portion having a central axis, an outer frame and a plurality of fixed coil portions, the fixed coil portions being equally spaced from the central axis, the fixed coil portions being secured on the outer frame and being separated, each fixed coil portion having a coil and two electric connecting points;

an eccentric rotor having a bearing, a rotatory shaft, an eccentric arm, an eccentric shaft portion, a supporting plate, an inner annular magnetic portion, and an outer annular magnetic portion; the rotary shaft being pivoted on the bearing and aligned with the central axis; the eccentric shaft arm having two ends, one end of the eccentric shaft arm being connected with the rotary shaft, the other end of the eccentric shaft arm being connected with the eccentric shaft portion; the eccentric shaft portion being secured with the supporting plate; the supporting plate having an inner annular zone and an outer annular zone; the inner annular magnetic portion having a first inner magnetic portion and a second inner magnetic portion; the outer annular magnetic portion having a first outer magnetic portion and a second outer magnetic portion; the first inner magnetic portion and second outer magnetic portion having same magnetic polarity; the second inner magnetic portion and first outer magnetic portion having same magnetic polarity; the inner annular magnetic portion being attached to the inner annular zone, the outer annular magnetic portion being attached to the outer annular zone; a gap being disposed between the first inner magnetic portion as well as the first outer magnetic portion and the fixed coil portions;

wherein the inner magnetic portion and the outer magnetic portion having a same center which is aligned with the eccentric shaft portion, and the eccentric shaft portion being offset from the rotary shaft; and wherein electric energy is supplied to the connecting points and the rotary shaft generates an output of kinetic energy; an alternating current enters the fixed coil portions generating periodically varying magnetic flux so as to force the eccentric rotor to rotate and generate kinetic energy from the rotary shaft.

In addition, an energy converting device having an eccentric rotor comprising:

a fixed portion including a central axis, an outer frame, and a plurality of fixed coil portions, the fixed coil portions being equally spaced from the central axis, the fixed coil portions being secured on the outer frame and being separated, each fixed coil portion having a coil and two electric connecting points;

an eccentric rotor including a bearing, a rotatory shaft, an eccentric arm, an eccentric shaft portion, an inner annular magnetic portion, and an outer annular magnetic portion; the rotary shaft being pivoted on the bearing and aligned with the central axis; the eccentric shaft arm having two ends, one end of the eccentric shaft arm being connected with the rotary shaft, the other end of the eccentric shaft arm being connected with the eccentric shaft portion; the inner annular magnetic portion having a first inner magnetic portion and a second inner magnetic portion; the outer annular magnetic portion having a first outer magnetic portion and a second outer magnetic portion; the first inner magnetic portion and the second outer magnetic portion having same magnetic polarity, the second inner magnetic portion and the first outer magnetic portion having same magnetic polarity; a gap being disposed between the first inner magnetic portion as well as the first outer magnetic portion and the fixed coil portions;

a cycloidal speed reducer including an eccentric connecting shaft, an eccentric cycloidal disk, a ring gear wheel, a transmitting pin set, and an output disk; the transmitting pin set and the output disk being formed integrally; the eccentric connecting shaft being integrally connected with the eccentric shaft portion; the eccentric cycloidal disk containing an inner annular area and an outer annular area; the inner magnetic portion being secured on the inner annular area; the outer magnetic portion being secured on the outer annular area; the outer frame and the ring gear wheel being secured as an integral structure, an eccentrically mounted bearing being disposed on the eccentric connecting shaft;

said inner magnetic portion and the outer magnetic portion being concentric about the eccentric shaft portion, the eccentric shaft portion being offset from the rotary shaft;

so that when alternating currents are supplied to the fixed coil portions, periodically varying magnetic flux is generated so as to force the eccentric rotor to rotate; due to that the inner magnetic portion and the outer magnetic portion are secured on the eccentric cycloidal disk of the cycloidal speed reducer, speed reduction with torque magnification is achieved from the output disk.

DETAILED DESCRIPTION OF THE PREFERRED EMBODIMENT

Figure 1:
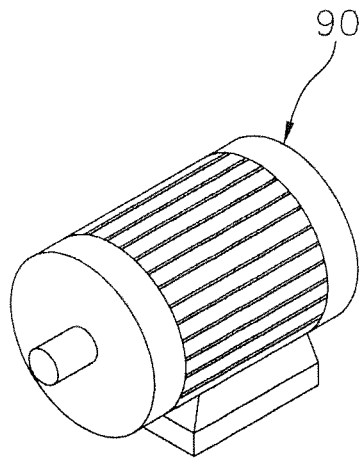
FIG. 1 is a perspective view of a traditional radial flux motor.
Figure 2:
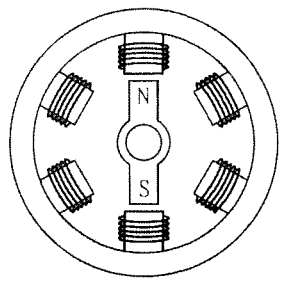
FIG. 2 is a cross-sectional view of a traditional radial flux motor.
Figure 3A:
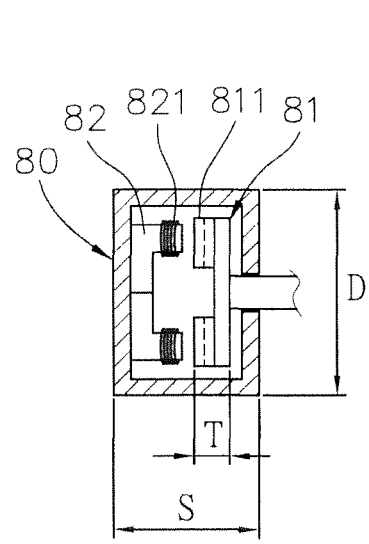
FIG. 3A is a cross-sectional view of a traditional axial flux motor.
Figure 3B:
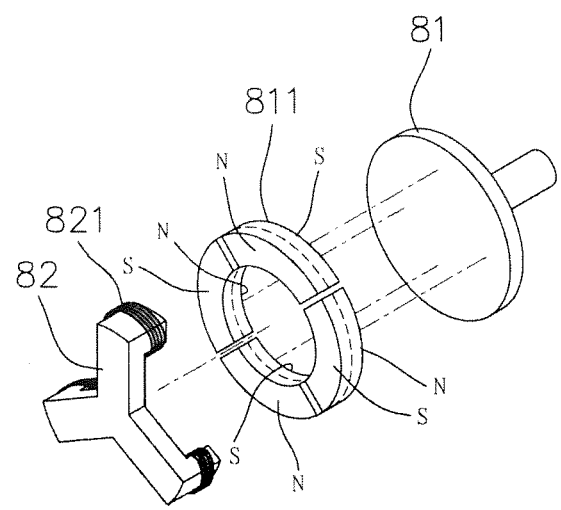
FIG. 3B is a cross-sectional view of an inner structure of a traditional axial flux motor.
Figure 4:
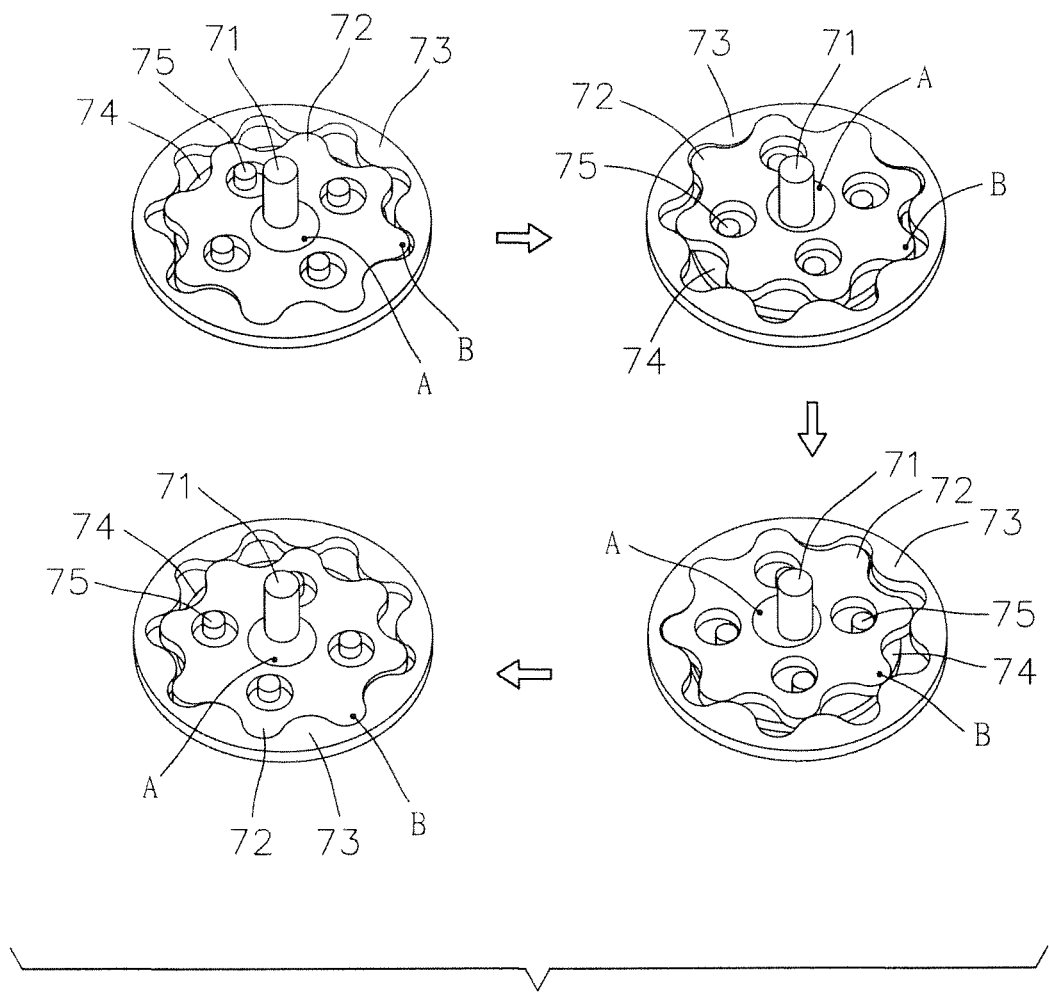
FIG. 4 is a view showing the structure and operation of a traditional cycloidal speed reducer.
Figure 5:
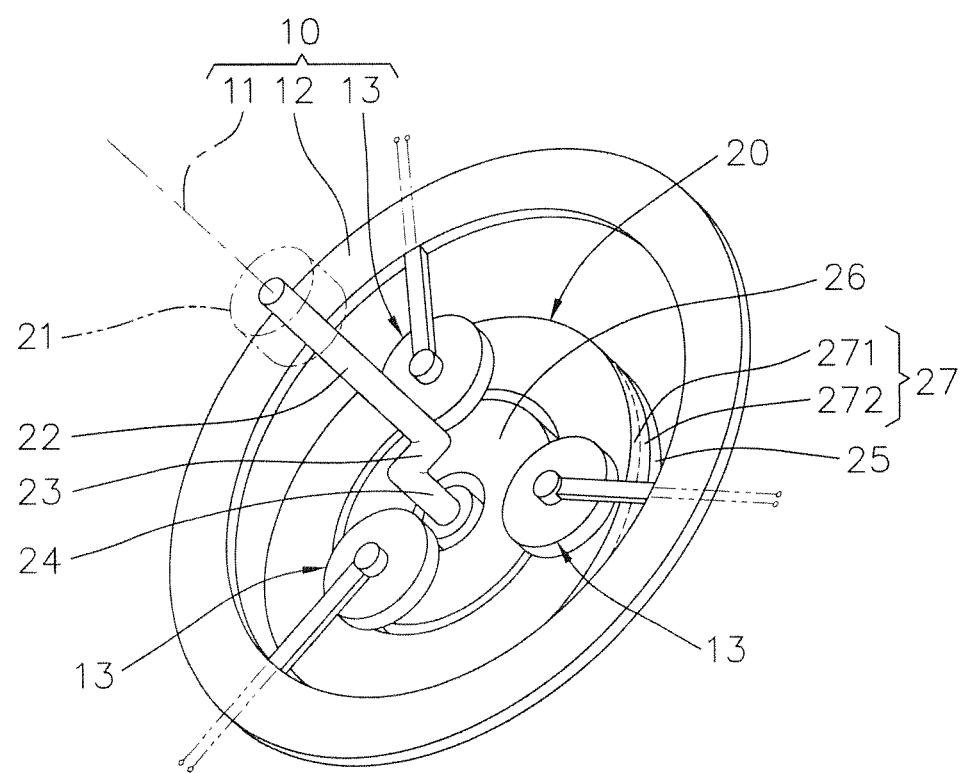
FIG. 5 is a perspective view of the present invention.
Figure 6:
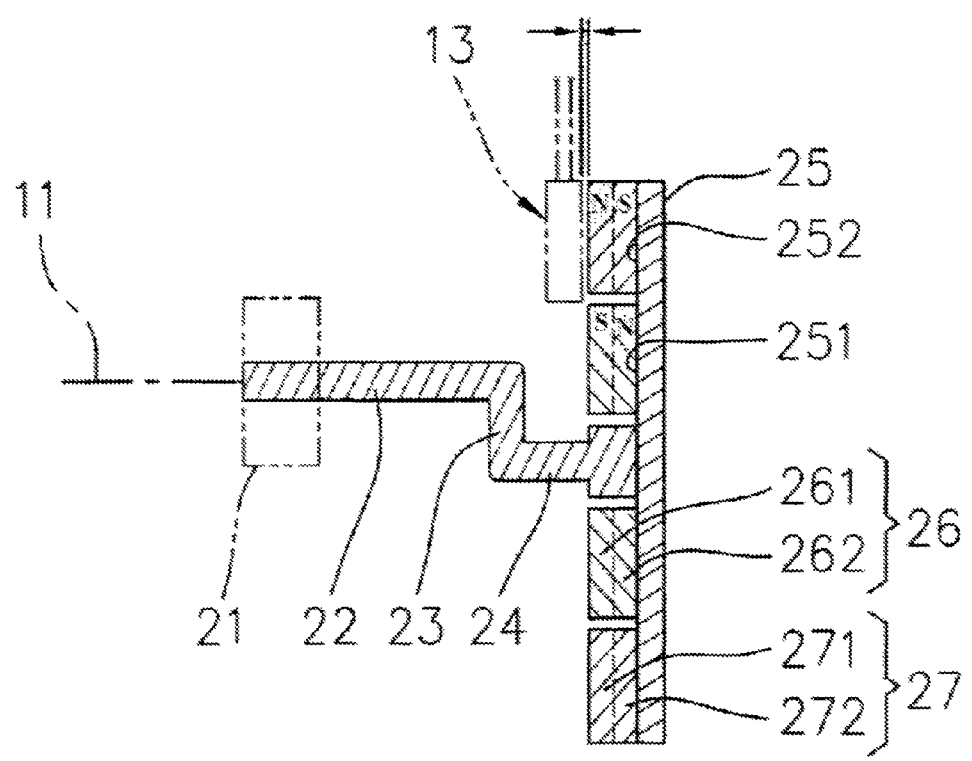
FIG. 6 is a cross-sectional view of this invention.
Figure 7:
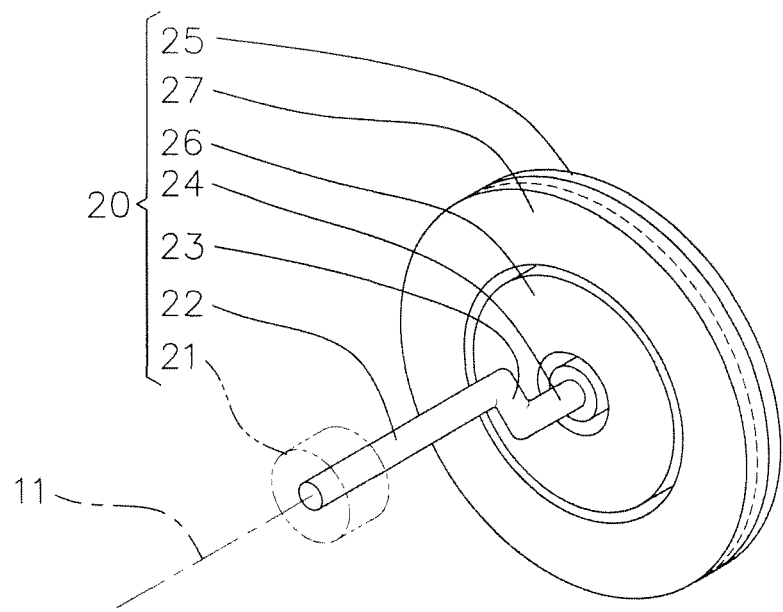
FIG. 7 is a perspective view of the eccentric rotor of this invention.
Figure 8:
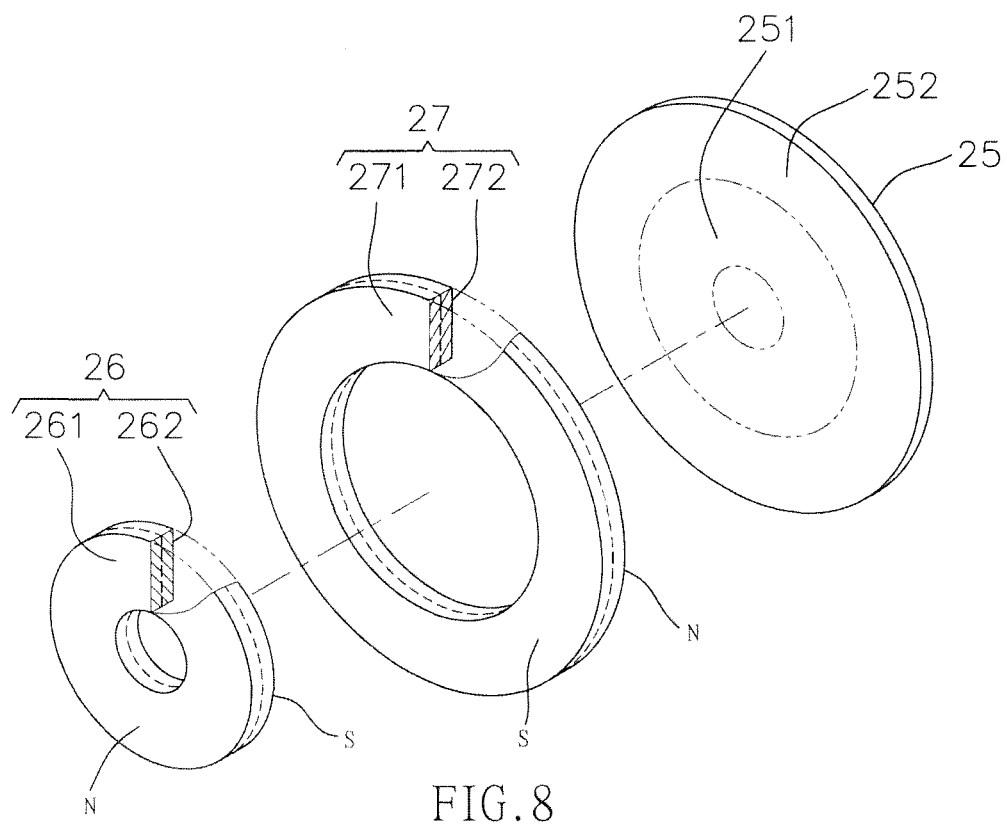
FIG. 8 is an exploded view of the eccentric rotor of this invention.
Figure 9:
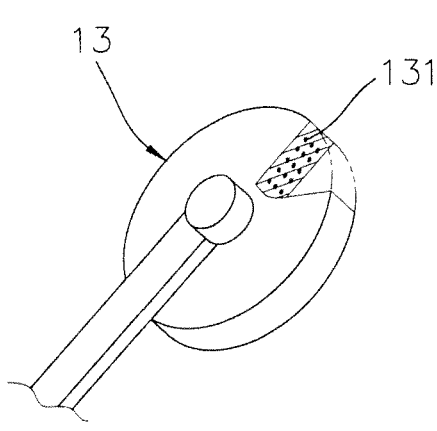
FIG. 9 is a view illustrating the fixed coil portion of this invention.
Figure 10:
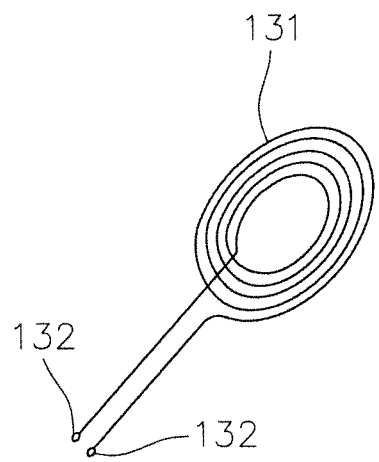
FIG. 10 is a view showing the coil of the fixed coil portion of this invention.

The present invention relates to an energy converting device having an eccentric rotor. It has two converting methods. One is to be used as an electric generator. The other one is to be used as a motor.

Referring to FIGS. 5 to 10, it is the first preferred embodiment of this invention which is to be used as an electric generator. This invention is an energy converting device having an eccentric rotor. It mainly comprises a fixed portion 10 and an eccentric rotor 20.

With regard to this fixed portion 10, it has a central axis 11, an outer frame 12, and a plurality of fixed coil portions 13. In this case, there are three fixed coil portions 13 (at least two; preferably three or four or multiple thereof). The fixed coil portions 10 are equally spaced from the central axis 11 (if there are only two fixed coil portions 10, they should be separated by 90 degrees). The fixed coil portions 13 are secured on the outer frame 12 and are separated. Each fixed coil portion 13 has a coil 131 and two electric connecting points 132.

Concerning this eccentric rotor 20, it has a bearing 21, a rotatory shaft 22, an eccentric arm 23, an eccentric shaft portion 24, a supporting plate 25, an inner annular magnetic portion 26, and an outer annular magnetic portion 27. Furthermore, the rotary shaft 22 is pivoted on the bearing 21 and aligned with the central axis 11. The eccentric shaft arm 23 has two ends. One end of the eccentric shaft arm 23 is connected with the rotary shaft 22. The other end of the eccentric shaft arm 23 is connected with the eccentric shaft portion 24. The eccentric shaft portion 24 is secured with the supporting plate 25. Moreover, the supporting plate 25 has an inner annular zone 251 and an outer annular zone 252. The inner annular magnetic portion 26 has a first inner magnetic portion 261 and a second inner magnetic portion 262 (representing the N and S of the inner magnetic portion respectively). Similarly, the outer annular magnetic portion 27 has a first outer magnetic portion 271 and a second outer magnetic portion 272 (representing the S and N of the outer magnetic portion respectively). Furthermore, the first inner magnetic portion 261 and second outer magnetic portion 272 have same magnetic polarity (such as N). The second inner magnetic portion 262 and first outer magnetic portion 271 have same magnetic polarity (such as S). The inner annular magnetic portion 26 is attached to the inner annular zone 251. The outer annular magnetic portion 27 is attached to the outer annular zone 252. A gap G is disposed between the first inner magnetic portion 261 as well as the first outer magnetic portion 271 and the fixed coil portions 13.

In which, the inner magnetic portion 26 and the outer magnetic portion 27 have a same center which is aligned with the eccentric shaft portion 24. The eccentric shaft portion 24 is offset from the rotary shaft 22.

Figure 11:
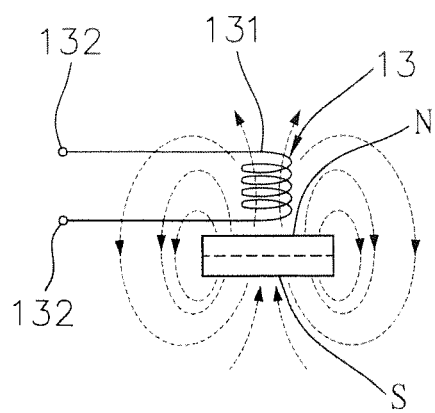
FIG. 11 is a view showing the relationship between the coil and the magnetic flux.
Figure 12:
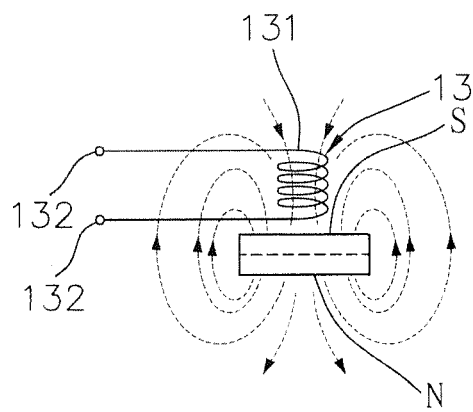
FIG. 12 is another view showing the relationship between the coil and the magnetic flux.
Figure 13:
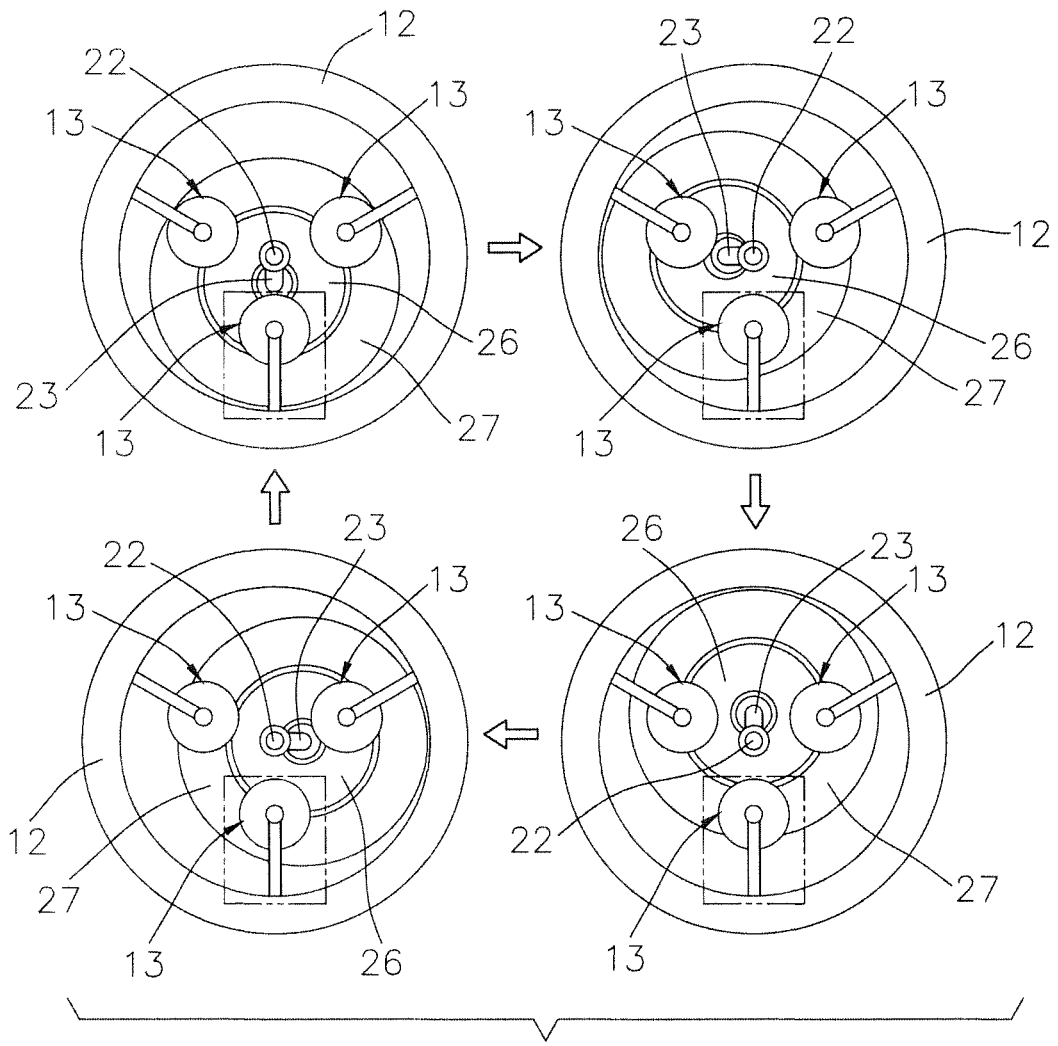
FIG. 13 is a view of the operation principle of this invention.
Figure 14:
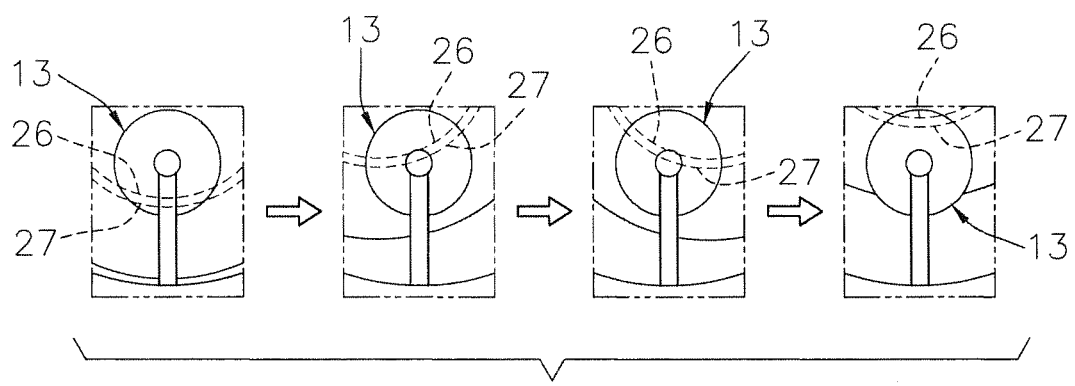
FIG. 14 is a view of the operation principle of one fixed coil portion of this invention.

Hence, when the rotary shaft 22 of the eccentric rotor 20 rotates, these fixed coil portions 13 cut through the inner magnetic portion 26 and the outer magnetic portion 27 repeatedly. Therefore, magnetic flux passing through the coils 131 of the eccentric shaft portions 24 alternates accordingly. So, electromotive force (emf) is generated at the two electric connecting points 132, as shown in FIGS. 11 and 12.

About the operation of this invention, it is exhibited by FIGS. 11 to 14.

One cycle of a rotation is divided into four portions. In addition, the one (that is positioned at the lowest; marked within the dotted line) of these three fixed coil portions 13 is selected to be explained as an example (other portions have the same principle).

[a] rotating to the bottom. As shown in the upper left portion in FIG. 13, at this moment, a portion (roughly 9/10) of the lowest fixed coil portion 13 is positioned over the inner magnetic portion 26. The portion of the lowest fixed coil portion 13 over the outer magnetic portion 27 is extremely small (roughly 1/10), as illustrated in the left one of FIG. 14.

[b] rotating to the left-hand side. As shown in the upper right portion in FIG. 13, at this moment, a portion (roughly 1/4) of the lowest fixed coil portion 13 is positioned over the inner magnetic portion 26. The remaining portion (roughly 3/4) of the lowest fixed coil portion 13 is over the outer magnetic portion 27, as illustrated in the second left of FIG. 14.

[c] rotating to the top. As shown in the lower right portion in FIG. 13, at this moment, a very tiny portion (roughly 1/20) of the lowest fixed coil portion 13 is positioned over the inner magnetic portion 26. The remaining portion (roughly 19/20) of the lowest fixed coil portion 13 is over the outer magnetic portion 27, as illustrated in the third one counting from the left in FIG. 14.

[d] rotating to the right-hand side. As shown in the lower left portion in FIG. 13, at this moment, a portion (roughly 1/3) of the lowest fixed coil portion 13 is positioned over the inner magnetic portion 26. The remaining portion (roughly 2/3) of the lowest fixed coil portion 13 is over the outer magnetic portion 27, as illustrated in the right one of FIG. 14.

Thus, when it rotates one cycle, the N-S ratio varies. So, when it continues to rotate, the N-S-N-S . . . variation is repeated. Because the three fixed coil portions 13 are separated by 120 degrees with each other, three voltage variations will be generated with the phase difference of 120 degrees. That is, three-phase alternating current is generated accordingly.

Figure 15:
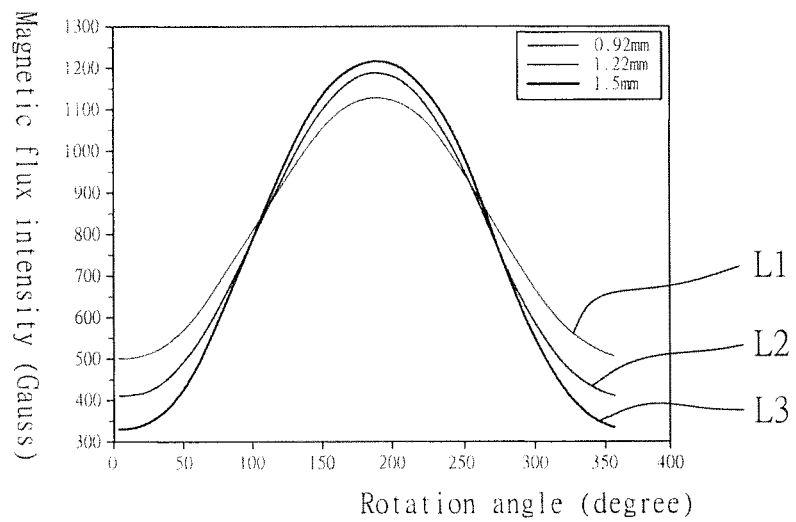
FIG. 15 illustrates the magnetic flux variations passing through a coil as the eccentric rotor rotates a circle for different magnitude of eccentricity.

As illustrated in FIG. 15, it shows the experimental data of this invention. When the eccentric distance is kept at 0.92 mm, 10.22 mm and 1.5 mm, the corresponding magnetic intensity conditions (or called flux variations) are shown by a first curve L1, a second curve L2, and a third curve L3, respectively.

Of course, the first inner magnetic portion 261 and second outer magnetic portion 272 can be changed to the S (magnetic polarity). Under this condition, the second inner magnetic portion 262 and first outer magnetic portion 271 are changed to the N (magnetic polarity) according. Hence, it also can produce the same three-phase alternating current.

Besides, the supporting plate 25 can be made by a non-magnetic material or magnetic material. If it is made by a magnetic material, the inner magnetic portion 26 and the outer magnetic portion 27 will form a complete magnetic route. That can reduce magnetic flux leakage.

Figure 16:
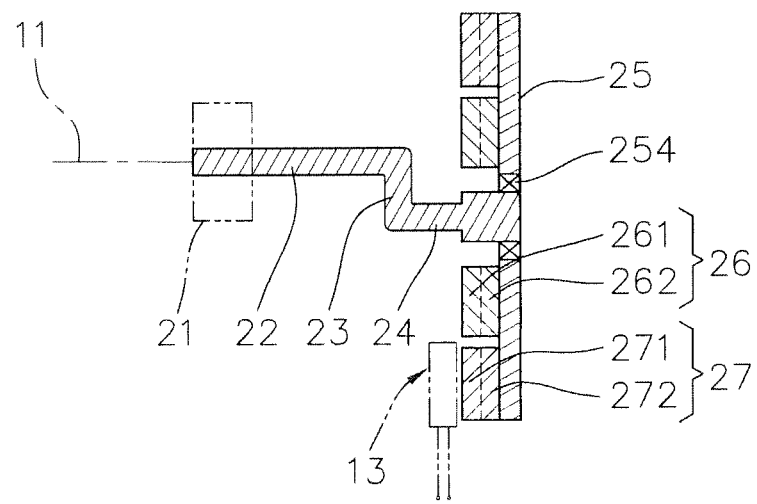
FIG. 16 is a view showing this invention further comprising an auxiliary bearing.

Furthermore, as exhibited in FIG. 16, an auxiliary bearing 254 can be disposed at the center of the supporting plate 25 and pivoted on the eccentric shaft portion 24. Consequently, it causes the eccentric rotor 20 to have two degrees of freedom (in rotation). If the rotating center is also the mass center, the mass center can be forced to rotate around the rotary shaft 22, while the eccentric rotor 20 (including the inner magnetic portion 26 and the outer magnetic portion 27 secured thereon) does not rotate. Therefore, the supporting plate 25 just moves without rotation (i.e., translates) and forces the eccentric shaft portion 24 to rotate. Under such circumstance, the effective moment of inertia of the eccentric rotor 20 can be reduced significantly (effective moment of inertia $I_E = Me^2$, where M is mass and e is the eccentric distance). By such a design, it can improve the performance of acceleration or deceleration.

In the above-mentioned case, the rotary shaft 22 is the kinetic energy input, and the connecting points 13 of the fixed coil portions 13 produce electric energy. It thus functions as an electric generator which converts kinetic energy into electric energy.

Based on the same theory, it can be used in the reverse way to become an electric motor. That is the second preferred embodiment of this invention.

About the second preferred embodiment, its structure is the same as the one of the first preferred embodiment. But the input and output are interchanged. In the second preferred embodiment, the input is the electric energy (such as three-phase alternating current) from the connecting points 132. The rotary shaft 22 becomes an output of kinetic energy. Thus, it can achieve the function for converting the electric energy into kinetic energy.

More specifically, electric energy can be supplied to the connecting points 132 and the rotary shaft 22 becomes an output of kinetic energy, so that an alternating current enter the fixed coil portions 13 generating periodically-varying magnetic flux so as to force the eccentric rotor 20 to rotate and generate kinetic energy from the rotary shaft 22.

Figure 17:
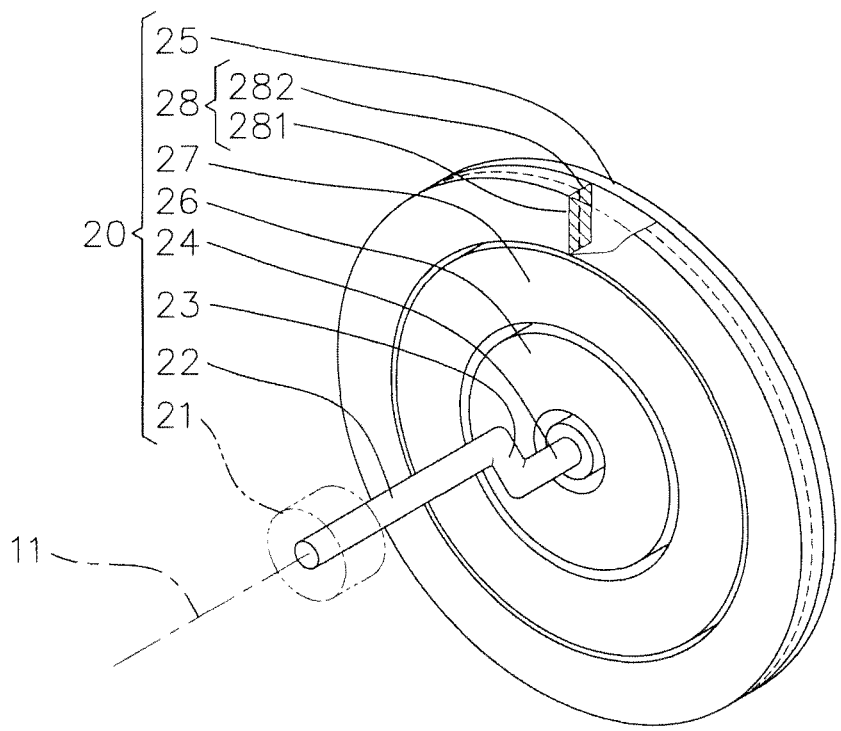
FIG. 17 is a perspective view of an embodiment of this invention having a three-ring design.

In addition, as shown in FIG. 17, it is another preferred embodiment to be used as an electric generator. The major structure is the same as the one in the first preferred embodiment. The differences are listed below.

[a] The inner magnetic portion 26 and the outer magnetic portion 27 are modified from a two-ring design into a three-ring design, namely the inner magnetic portion 26, the outer magnetic portion 27, and the outermost magnetic portion 28, all concentric. The outermost magnetic portion 28 includes a first outermost magnetic portion 281 and a second outermost magnetic portion 282. The supporting plate 25 further includes an outermost zone 253 for securing the second outermost magnetic portion 282. The first outermost magnetic portion 281 and the first inner magnetic portion 261 have the same magnetic polarity. The second outermost magnetic portion 282 and the second inner magnetic portion 262 have the same magnetic polarity.

[b] Each fixed coil portion 13 includes a first coil portion 13A and a second coil portion 13B, connected in series. The first coil portion 13A is relatively closer to the center. So, the second coil portion 13B is relative outer. Furthermore, the winding direction of the first coil portion 13A is opposite to the winding direction of the second coil portion 13B. Plus, the distance between the center of the first coil portion 13A and the center of the second coil portion 13B is substantially equal to the width of the ring portion of the outer magnetic portion 27.

Figure 18:
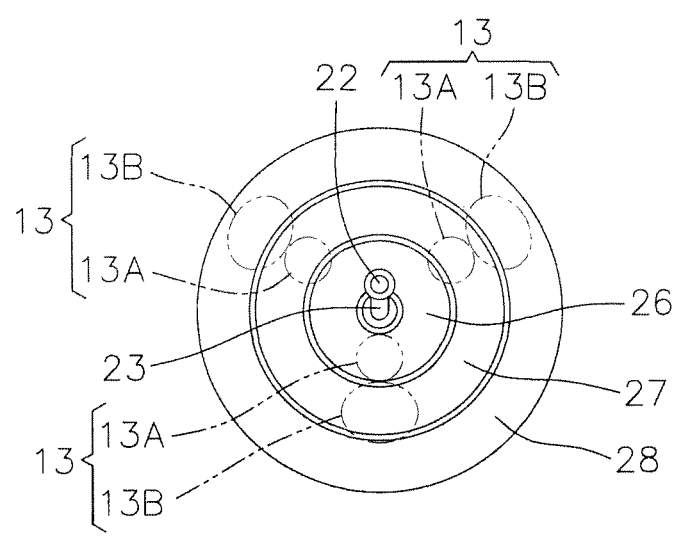
FIG. 18 is another view of an embodiment of this invention having a three-ring design.

With reference to FIG. 18, regarding its operation, when it rotates one cycle, the first coil portion 13A will move between a position above the inner magnetic portion 26 and the outer magnetic portion 27. Similarly, the second coil portion 13B will move between a position above the outer magnetic portion 27 and the outermost magnetic portion 28. The electric generating principle is the same as the first preferred embodiment mentioned previously (the detailed description is omitted here). Therefore, when such rotation is repeated, electricity can be generated.

Figure 19:
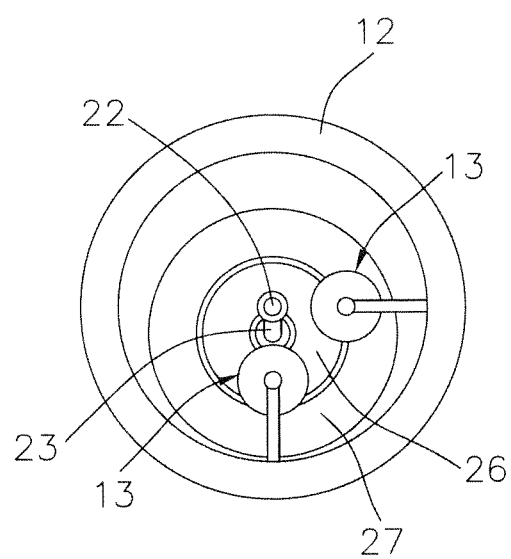
FIG. 19 is a perspective view of the fourth preferred embodiment of this invention.

Besides, as illustrated in FIG. 19, it is the fourth preferred embodiment. In which, it is an electric motor. The main structure is as same as the one of the second embodiment. The difference is described below.

Only two fixed coil portion 13 are used. Both are disposed on the outer frame 12 and spaced by 90 degrees apart. Thus, by utilizing the phase difference between the supplied currents, the rotor can be forced to rotate and produce kinetic energy.

Figure 20:
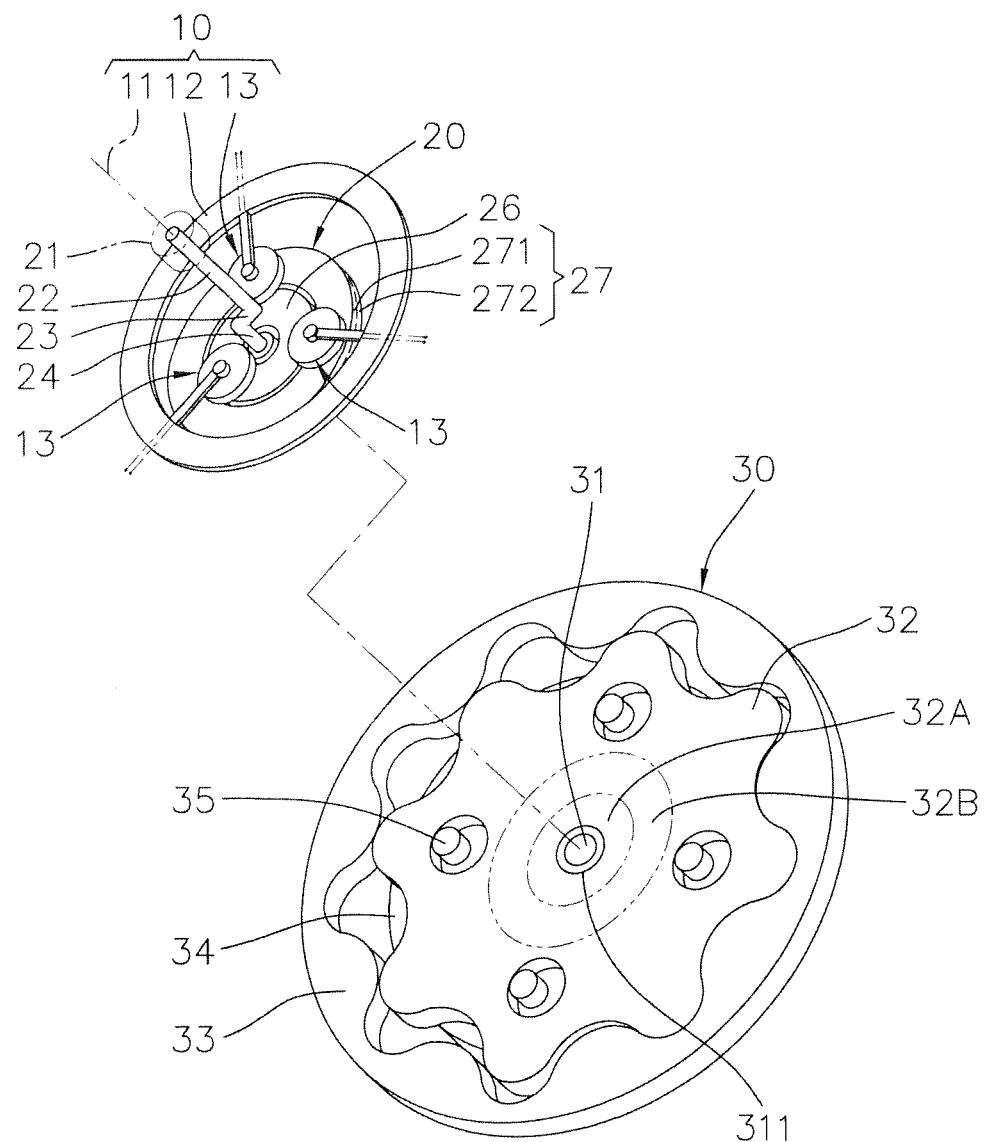
FIG. 20 is an exploded view of the fifth preferred embodiment of this invention.
Figure 21:
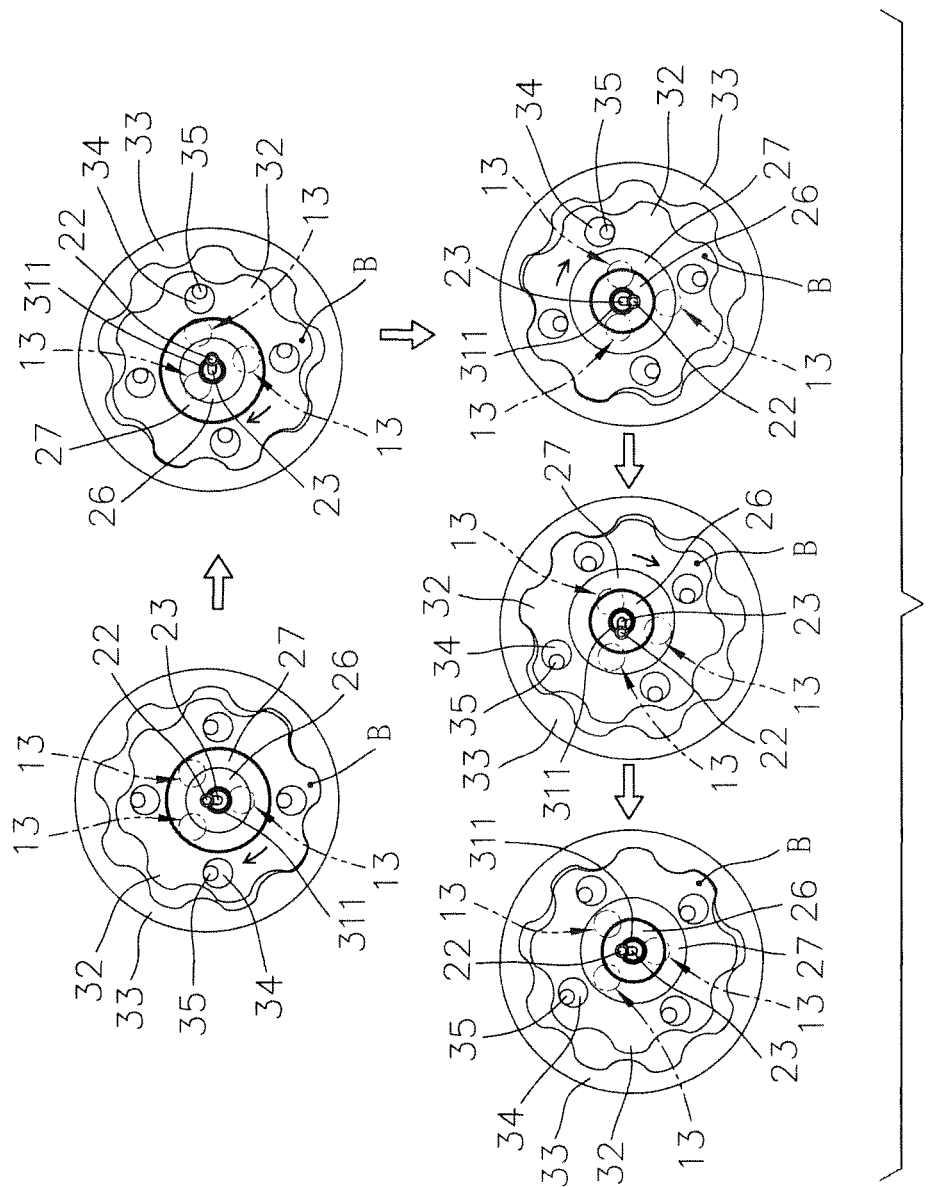
FIG. 21 is a view showing the operation process of the fifth preferred embodiment of this invention.
Figure 22:
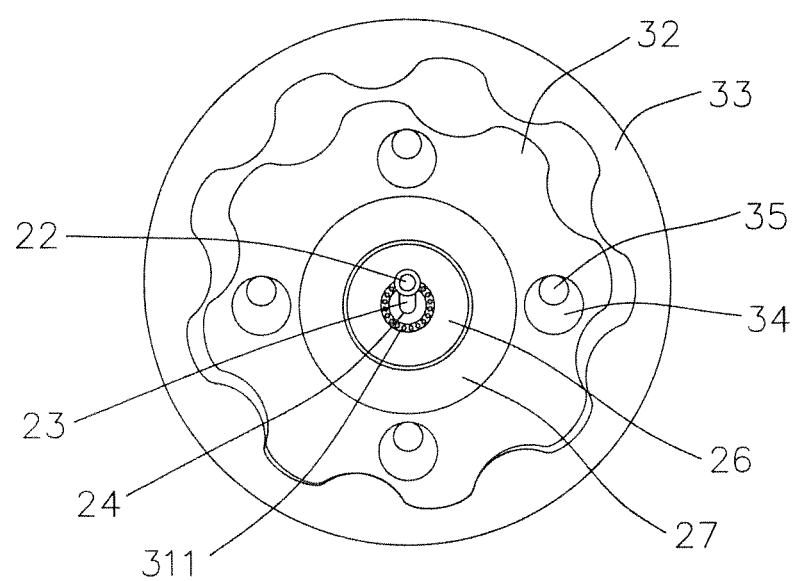
FIG. 22 is a view showing a portion of the fifth preferred embodiment of this invention.

FIGS. 20, 21, and 22 show the fifth preferred embodiment of the present invention. It smoothly integrates the fixed portion 10, the eccentric rotor 20, and a cycloidal speed reducer 30. Hence, an electric motor with speed reducing function is obtained.

It includes a fixed portion 10, an eccentric rotor 20, and a cycloidal speed reducer 30.

With regard to this fixed portion 10, it has a central axis 11, an outer frame 12, and a plurality of fixed coil portions 13. In this case, there are three fixed coil portions 13 (at least two; preferably three or four or multiple thereof). The fixed coil portions 10 are equally spaced from the central axis 11 (if there are only two fixed coil portions 10, they should be separated by 90 degrees). The fixed coil portions 13 are secured on the outer frame 12 and are separated. Each fixed coil portion 13 has a coil 131 and two electric connecting points 132.

Concerning this eccentric rotor 20, it has a bearing 21, a rotatory shaft 22, an eccentric arm 23, an eccentric shaft portion 24, an inner annular magnetic portion 26, and an outer annular magnetic portion 27. Furthermore, the rotary shaft 22 is pivoted on the bearing 21 and aligned with the central axis 11. The eccentric shaft arm 23 has two ends. One end of the eccentric shaft arm 23 is connected with the rotary shaft 22. The other end of the eccentric shaft arm 23 is connected with the eccentric shaft portion 24. The inner annular magnetic portion 26 has a first inner magnetic portion 261 and a second inner magnetic portion 262 (representing the N and S of the inner magnetic portion respectively). Similarly, the outer annular magnetic portion 27 has a first outer magnetic portion 271 and a second outer magnetic portion 272 (representing the S and N of the outer magnetic portion respectively). Furthermore, the first inner magnetic portion 261 and the second outer magnetic portion 272 have same magnetic polarity (such as N). The second inner magnetic portion 262 and the first outer magnetic portion 271 have same magnetic polarity (such as S). A gap G is disposed between the first inner magnetic portion 261 as well as the first outer magnetic portion 271 and the fixed coil portions 13.

About the cycloidal speed reducer 30, it includes an eccentric connecting shaft 31, an eccentric cycloidal disk 32, a ring gear wheel 33 (or called ring pins), a transmitting pin set 34, and an output disk 35. The transmitting pin set 34 and the output disk 35 are formed as one integral structure. The eccentric connecting shaft 31 is integrally connected with the eccentric shaft portion 24. The eccentric cycloidal disk 32 contains an inner annular area 32A and an outer annular area 32B. Furthermore, the inner magnetic portion 26 is secured on the inner annular area 32A. And, the outer magnetic portion 27 is secured on the outer annular area 32B. In addition, the outer frame 12 and the ring gear wheel 33 are secured as an integral structure. An eccentrically mounted bearing 311 is disposed on the eccentric connecting shaft 31. In which, the inner magnetic portion 26 and the outer magnetic portion 27 are concentric about the eccentric shaft portion 24. And, the eccentric shaft portion 24 is offset from the rotary shall 22.

Therefore, when alternating currents are supplied to the fixed coil portions 13, the periodically varying magnetic flux is generated so that the eccentric rotor 20 is forced to rotate. Because the inner magnetic portion 26 and the outer magnetic portion 27 are secured on the eccentric cycloidal disk 32, this cycloidal speed reducer 30 can achieve the speed reduction function. The desired output is obtained from the output disk 35.

With regard to the operation principle of the cycloidal speed reducer 30, it is the same as the traditional cycloidal speed reducer and is omitted Therefore, the advantages and functions of this invention can be summarized as follows.

[1] The rotor structure is simple and its magnetic field is evenly distributed. The single annular magnet can be made more easily and its magnetic field varies more smoothly.

[2] Magnetic flux distribution around the rotor can be more easily analyzed.

[3] When the rotor rotates at a constant speed, the magnetic flux variation in the fixed coil portion is close to a sine wave. Conversely, if a sinusoidal electric current is applied, smooth rotation and torque can be generated.

[4] The rotor center can be optionally disposed with an auxiliary bearing or an eccentrically mounted bearing 311 (shown in FIG. 16 and FIG. 20 respectively). Thus, the rotating rotor has two degrees of freedom in rotation. Assuming the rotor center is also its mass center, the mass center can be forced to rotate about the shaft portion 22, while the eccentric rotor 20 will just move without rotating (or translate) about the shaft. Therefore, the effective moment of inertia of the eccentric rotor 20 can be reduced significantly (effective moment of inertia $I_E = Me^2$, where in M is mass and e is the eccentric distance). By such a design, it can improve the motor's acceleration and deceleration performance.

[5] It can be seamlessly integrated with the cycloidal speed reducer so as to form a cycloidal motor. The total volume of the product is significantly reduced because the flat fixed portion 19, the eccentric rotor 20, and the cycloidal speed reducer 30 are combined together. Meanwhile, the cycloidal motor does not need a shaft coupler to transmit power from an external motor, ensuring a smoother operation.

While this invention has been elaborated with references to the preferred embodiments thereof, it will be understood by those skilled in the art that various changes or modifications can be made therein without departing from the scope of the invention.

What is claimed is:

1. An energy converting device having an eccentric rotor comprising:
   a fixed portion having a central axis, an outer frame and a plurality of fixed coil portions, said fixed coil portions being equally spaced from said central axis, said fixed coil portions being secured on said outer frame and being separated, each fixed coil portion having a coil and two electric connecting points;

an eccentric rotor having a bearing, a rotatory shaft, an eccentric shaft arm, an eccentric shaft portion, a supporting plate, an inner annular magnetic portion, and an outer annular magnetic portion; said rotary shaft being pivoted on said bearing and aligned with said central axis; said eccentric shaft arm having two ends, one end of said eccentric shaft arm being connected with said rotary shaft, the other end of said eccentric shaft arm being connected with said eccentric shaft portion; said eccentric shaft portion being secured with said supporting plate; said supporting plate having an inner annular zone and an outer annular zone; said inner annular magnetic portion having a first inner magnetic portion and a second inner magnetic portion; said outer annular magnetic portion having a first outer magnetic portion and a second outer magnetic portion; said first inner magnetic portion and second outer magnetic portion having same magnetic polarity; said second inner magnetic portion and first outer magnetic portion having same magnetic polarity; said inner annular magnetic portion being disposed on said inner annular zone, said outer annular magnetic portion being disposed on said outer annular zone; a gap being disposed between said first inner magnetic portion as well as said first outer magnetic portion and said fixed coil portions;

wherein said inner annular magnetic portion and said outer annular magnetic portion having a same center which is aligned with said eccentric shaft portion, and said eccentric shaft portion being offset from said rotary shaft; and wherein electric energy is supplied to said connecting points and said rotary shaft becoming an output of kinetic energy, so that an alternating current enter said fixed coil portions generating periodically-varying magnetic flux so as to force said eccentric rotor to rotate and generate kinetic energy from said rotary shaft.

2. An energy converting device having an eccentric rotor as claimed in claim 1, wherein an auxiliary bearing is disposed at the center of the supporting plate and pivoted on the eccentric shaft portion.

3. An energy converting device having an eccentric rotor as claimed in claim 1, wherein two fixed coil portions are disposed, both are disposed on the outer frame and spaced by 90 degrees apart.

4. An energy converting device having an eccentric rotor as claimed in claim 1, wherein said eccentric rotor further comprising an outermost magnetic portion, said outermost magnetic portion includes a first outermost magnetic portion and a second outermost magnetic portion; said first outermost magnetic portion and said first inner magnetic portion having the same magnetic polarity; said second outermost magnetic portion and said second inner magnetic portion having the same magnetic polarity;

each fixed coil portion including a first coil portion and a second coil portion, connected in series; the winding direction of said first coil portion is opposite to the winding direction of said second coil portion; the distance between the center of the first coil portion and the center of the second coil portion being substantially equal to the width of said ring portion of said outer magnetic portion.

5. An energy converting device having an eccentric rotor comprising:

a fixed portion including a central axis, an outer frame, and a plurality of fixed coil portions, said fixed coil portions being equally spaced from the central axis, said fixed coil portions being secured on said outer frame and being separated, each fixed coil portion having a coil and two electric connecting points;

an eccentric rotor including a bearing, a rotatory shaft, an eccentric shaft arm, an eccentric shaft portion, an inner annular magnetic portion, and an outer annular magnetic portion; said rotary shaft being pivoted on said bearing and aligned with said central axis; said eccentric shaft arm having two ends, one end of said eccentric shaft arm being connected with said rotary shaft, the other end of said eccentric shaft arm being connected with said eccentric shaft portion; said inner annular magnetic portion having a first inner magnetic portion and a second inner magnetic portion; said outer annular magnetic portion having a first outer magnetic portion and a second outer magnetic portion; said first inner magnetic portion and said second outer magnetic portion having same magnetic polarity, said second inner magnetic portion and said first outer magnetic portion having same magnetic polarity a gap being disposed between said first inner magnetic portion as well as said first outer magnetic portion and said fixed coil portions;

a cycloidal speed reducer including an eccentric connecting shaft, an eccentric cycloidal disk, a ring gear wheel, a transmitting pin set, and an output disk; said transmitting pin set and said output disk being formed integrally; said eccentric connecting shaft being integrally connected with said eccentric shaft portion; said eccentric cycloidal disk containing an inner annular area and an outer annular area; said inner magnetic portion being secured on said inner annular area; said outer magnetic portion being secured on said outer annular area; said outer frame and said ring gear wheel being secured as an integral structure, an eccentrically mounted bearing being disposed on said eccentric connecting shaft;

said inner annular magnetic portion and said outer annular magnetic portion being concentric about said eccentric shaft portion, said eccentric shaft portion being offset from said rotary shaft;

so that when alternating currents are supplied to said fixed coil portions, periodically-varying magnetic flux is generated so as to force said eccentric rotor to rotate; due to that said inner magnetic portion and said outer magnetic portion are secured on said eccentric cycloidal disk of said cycloidal speed reducer, speed reduction with torque magnification is achieved from said output disk.

\* \* \* \* \*